(12) United States Patent
He et al.

(10) Patent No.: US 8,163,193 B2
(45) Date of Patent: Apr. 24, 2012

(54) MODIFIER OF LITHIUM ION BATTERY AND METHOD FOR MAKING THE SAME

(75) Inventors: Xiang-Ming He, Beijing (CN); Jian-Jun Li, Beijing (CN); Li-Chun Zhang, Beijing (CN); Wei-Hua Pu, Beijing (CN); Jian Gao, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/032,776

(22) Filed: Feb. 23, 2011

(65) Prior Publication Data

US 2012/0049108 A1  Mar. 1, 2012

(30) Foreign Application Priority Data

| Aug. 27, 2010 | (CN) | ............................ 2010 1 0264757 |
| Aug. 27, 2010 | (CN) | ............................ 2010 1 0264760 |
| Nov. 23, 2010 | (CN) | ............................ 2010 1 0555227 |
| Nov. 23, 2010 | (CN) | ............................ 2010 1 0555228 |

(51) Int. Cl.
  *C09K 3/00* (2006.01)
  *C01B 25/45* (2006.01)
  *H01M 2/16* (2006.01)

(52) U.S. Cl. ............................. 252/1; 423/306; 429/247

(58) Field of Classification Search .................. 423/306; 429/247; 252/1
  See application file for complete search history.

(56) References Cited

U.S. PATENT DOCUMENTS

| 7,575,832 B2 | 8/2009 | Hennige et al. |
| 2007/0148520 A1* | 6/2007 | Shin et al. ........................ 429/33 |
| 2010/0167117 A1 | 7/2010 | Maroon et al. |
| 2011/0085958 A1* | 4/2011 | Swoyer et al. ................. 423/306 |

FOREIGN PATENT DOCUMENTS

| JP | 11067233 | 3/1999 |
| JP | 2009146610 | 7/2009 |
| WO | WO2008020850 | 2/2008 |

OTHER PUBLICATIONS

Correlation between AlPO4 nanoparticle coating thickness on LiCoO2 cathode and thermal stability. J.Cho, Electrochimica Acta 48 (2003) 2807-2811.

* cited by examiner

*Primary Examiner* — Wayne Langel
(74) *Attorney, Agent, or Firm* — Altis Law Group, Inc.

(57) ABSTRACT

A modifier of a lithium ion battery includes a mixture of a phosphorus source having a phosphate radical, a trivalent aluminum source, and a metallic oxide in a liquid phase solvent. A method for making the modifier of the lithium ion battery. In the method, a phosphorus source having a phosphate radical, a trivalent aluminum source, and a metallic oxide are provided. The phosphorus source, the trivalent aluminum source, and the metallic oxide are mixed in a liquid phase solvent to form a clear solution.

16 Claims, 10 Drawing Sheets providing a phosphorus source having a phosphate radical, a trivalent aluminum source and a metallic oxide mixing the phosphorus source having the phosphate radical, the trivalent aluminum source and the metallic oxide in a liquid phase solvent to form a clear solution providing a phosphorus source having a phosphate radical, a trivalent aluminum source and a metallic oxide mixing the phosphorus source having the phosphate radical, the trivalent aluminum source and the metallic oxide in a liquid phase solvent to form a clear solution

MODIFIER OF LITHIUM ION BATTERY AND METHOD FOR MAKING THE SAME

CROSS-REFERENCE TO RELATED APPLICATIONS

This application claims all benefits accruing under 35 U.S.C. §119 from China Patent Applications No. 201010264760.5, filed on Aug. 27, 2010, No. 201010264757.3, filed on Aug. 27, 2010, No. 201010555227.4, filed on Nov. 23, 2010, and No. 201010555228.9, filed on Nov. 23, 2010, in the China Intellectual Property Office, the contents of which are hereby incorporated by reference.

BACKGROUND

1. Technical Field

The present disclosure relates to a modifier of a lithium ion battery and method for making the same.

2. Description of Related Art

A typical lithium ion battery mainly includes a cathode, an anode, a separator, and an electrolyte. The performance of electrode active materials of the cathode and anode is a key factor, which influences the performance of the lithium ion battery.

Typical cathode active materials are $LiCoO_2$, $LiNiO_2$, $LiMn_2O_4$, and $LiFePO_4$. Typical anode active materials are carbonaceous materials such as graphite and carbon nanotubes. A conventional method for making an electrode includes steps of: mixing the electrode active materials, a conductive agent, and a binder as slurry; coating the slurry on a surface of a current collector, and heating the coated current collector to achieve the electrode. However, unwanted chemical reactions may occur during the charge and discharge of the lithium ion battery, especially at a high temperature. For example, some substance of the electrolyte may corrode the electrode active material or current collector such as aluminum foil. The separator may have an unacceptable shrinkage or may fuse at high temperatures. Thus, the lithium battery may have a low stability, and a capacity lost during the cycling process, especially at the high temperatures.

$AlPO_4$ has been studied as a material to improve the thermal stability of the lithium ion battery (referring to the article "Correlation between $AlPO_4$ nanoparticle coating thickness on $LiCoO_2$ cathode and thermal stability. J. Cho, Electrochimica Acta 48 (2003) 2807-2811").

In this article, a dispersion of $AlPO_4$ particles dispersed in the water is prepared first, and then $LiCoO_2$ cathode particles are added into the dispersion. Referring to FIG. 10, the $AlPO_4$ particles 602 are adhered to the surface of the $LiCoO_2$ cathode particles 604. After drying and heat treating processes, the $LiCoO_2$ cathode particles 604 are coated with the $AlPO_4$ particles 602. However, the small $AlPO_4$ particles 602 agglomerate easily with each other in water because it is water insoluble. When many $LiCoO_2$ cathode particles 604 are added in the dispersion, the first added $LiCoO_2$ cathode particles 604 adhere to many $AlPO_4$ particles 602, and subsequently added $LiCoO_2$ cathode particles 604 may not adhere to enough $AlPO_4$ particles 602. Even though the $LiCoO_2$ cathode particles 604 are wholly coated, the $AlPO_4$ particles 602 having uneven sizes are distributed on the surface of the cathode active material 604. Thus, the coated layer of $AlPO_4$ particles 602 is non-uniform. Therefore, cycling performance of the lithium ion battery including this product 600 is not maximized. Further, the $AlPO_4$ particle dispersion is difficult to use to improve other parts of the lithium battery, such as the separator and the current collector.

What is needed, therefore, is to provide a modifier of the lithium ion battery and a method for making the same which when applied to the lithium ion battery can increase its stability and safety.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
FIG. 1 is a flow chart of an embodiment of a method for making a modifier for a lithium ion battery.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Modifier of Lithium Ion Battery and Method for Making the Same

One embodiment of a modifier of a lithium ion battery includes a mixture of a phosphorus source having a phosphate radical, a trivalent aluminum source, and a metallic oxide in a liquid phase solvent.

The phosphate radical can be orthophosphoric radical ($PO_4^{3-}$), dihydrogen phosphate radical ($H_2PO_4^-$), hydrophosphate radical ($HPO_4^{2-}$), or any combination thereof. The phosphorus source having an orthophosphoric radical can be at least one of phosphoric acid ($H_3PO_4$), triammonium phosphate (($NH_4)_3PO_4$), and aluminum phosphate ($AlPO_4$). The phosphorus source having a dihydrogen phosphate radical can be at least one of ammonium dihydrogen phosphate ($NH_4H_2PO_4$) and aluminum dihydrogen phosphate ($Al(H_2PO_4)_3$). The phosphorus source having a hydrophosphate radical can be at least one of diammonium hydrogen phosphate (($NH_4)_2HPO_4$) and dialuminum hydrogen phosphate ($Al_2(HPO_4)_3$). The trivalent aluminum source can be at least one of aluminum hydroxide (Al(OH)$_3$), aluminum oxide (Al$_2$O$_3$), aluminum phosphate (AlPO$_4$), aluminum dihydrogen phosphate (Al(H$_2$PO$_4$)$_3$), and dialuminum hydrogen phosphate (Al$_2$(HPO$_4$)$_3$). The phosphorus source having a phosphate radical and the trivalent aluminum source both can be AlPO$_4$, Al(H$_2$PO$_4$)$_3$, Al$_2$(HPO$_4$)$_3$, or any combination thereof. The metallic oxide can be at least one of chromium trioxide (CrO$_3$), zinc oxide (ZnO), copper oxide (CuO), magnesium oxide (MgO), zirconium dioxide (ZrO$_2$), molybdenum trioxide (MoO$_3$), vanadium pentoxide (V$_2$O$_5$), niobium pentoxide (Nb$_2$O$_5$), and tantalum pentoxide (Ta$_2$O$_5$).

The modifier is a clear solution having some stickiness. The liquid phase solvent of the modifier can be water or N-methyl-pyrrolidone (NMP). In one embodiment, a molar ratio of the trivalent aluminum source, the metallic oxide, and the phosphorus source is set by (Mol$_{Al}$+Mol$_{Metal}$):Mol$_p$=about 1:2.5 to about 1:4, wherein Mol$_{Al}$ is the amount of substance of the aluminum element in the trivalent aluminum source, Mol$_{Metal}$ is the amount of substance of the metallic element in the metallic oxide, and Mol$_p$ is the amount of substance of the phosphorus element in the phosphorus source.

In one embodiment, the (Mol$_{Al}$+Mol$_{Metal}$):Mol$_p$ is in a range from about 1:2.5 to about 1:3. The modifier is a red clear solution if the metallic oxide is CrO$_3$. A concentration of the modifier can be adjusted according to an actual need for the thickness of a coating layer formed by the modifier. The liquid phase solvent can dilute the modifier to a low concentration to form a relatively thin coating layer. The concentration of the modifier can be represented by a total mass of the phosphate radical, the aluminum element and the metallic element divided by a volume of the modifier (i.e., a mass of the phosphate radical+a mass of the aluminum element+a mass of the metallic element/a volume of the modifier). In one embodiment, the concentration is in a range from about 0.02 grams per milliliter (g/ml) to about 0.08 g/ml.

The modifier can be coated on the surface of a current collector or an electrode plate of the lithium ion battery. A reaction occurs when the modifier is heated at a temperature higher than 100° C. The composition of the reaction product is at least one of Al$_x$M$_y$PO$_4$ and Al$_x$M$_y$(PO$_3$)$_3$. M represents at least one chemical element of Cr, Zn, Mg, Zr, Mo, V, Nb, and Ta. A valence of M is represented by k, wherein 0<x<1, 0<y<1, and 3x+ky=3. In one embodiment, M is Cr, k=3, and the composition of the reaction product is at least one of Al$_x$Cr$_{1-x}$PO$_4$ and Al$_x$Cr$_{1-x}$(PO$_3$)$_3$.

Referring to FIG. 1, one embodiment of a method for making the modifier of lithium ion battery includes the following steps:

S1, providing the phosphorus source having the phosphate radical, the trivalent aluminum source and the metallic oxide; and S2, mixing the phosphorus source having the phosphate radical, the trivalent aluminum source, and the metallic oxide in the liquid phase solvent to form a clear solution.

The liquid phase solvent can be water or N-methyl-pyrrolidone (NMP). In one embodiment, a molar ratio of the trivalent aluminum source, the metallic oxide and the phosphorus source is set by (Mol$_{Al}$+Mol$_{Metal}$):Mol$_p$=about 1:2.5 to about 1:4, wherein Mol$_{Al}$ is the amount of substance of the aluminum element in the trivalent aluminum source, Mol$_{Metal}$ is the amount of substance of the metallic element in the metallic oxide, and Mol$_p$ is the amount of substance of the phosphorus element in the phosphorus source. In one embodiment, the (Mol$_{Al}$+Mol$_{Metal}$):Mol$_p$ is in a range from about 1:2.5 to about 1:3.

The phosphorus source, the trivalent aluminum source and the metallic oxide can be added in the liquid phase solvent simultaneously or one by one. In one embodiment, the phosphorus source solution can be prepared first, and then the trivalent aluminum source and the metallic oxide can be added into the phosphorus source solution, simultaneously or one by one. The adding order of the trivalent aluminum source and the metallic oxide does not influence the final reaction product. In one embodiment, the phosphorus source is H$_3$PO$_4$, the trivalent aluminum source is Al(OH)$_3$, and the metallic oxide is CrO$_3$. A concentration of the H$_3$PO$_4$ is in a range from about 60% to about 90%. The H$_3$PO$_4$ aqueous solution is prepared first, then the Al(OH)$_3$ powders are added into the aqueous solution to react with the H$_3$PO$_4$. A white suspension of AlPO$_4$ is formed after a period of time. The CrO$_3$ powders are then added into the white suspension. After a while, the white suspension disappears, and a red clear solution is produced.

The step S2 can further include a step of stirring and heating a mixture of the phosphorus source, the trivalent aluminum source, and the metallic oxide in the liquid phase solvent to evenly mix the mixture and react thoroughly. In one embodiment, the heating temperature is in a range from about 60° C. to about 100° C. A time period for the stirring and heating can be in a range from about 2 hours to about 3 hours.

The following example further illustrates the modifier and the method for making the modifier.

EXAMPLE 1

Preparation of the Modifier 34.5 g of H$_3$PO$_4$ having a concentration of 85% and 14 g of deionized water are mixed as a solution in a container. The solution is magnetically stirred at about 80° C. for about 5 minutes. 5.9 g of Al(OH)$_3$ powders are then added in the solution to react with the H$_3$PO$_4$ for about 2 hours. A colloidal suspension is formed in the container. Further, 2.5 g of CrO$_3$ powders are added in the colloidal suspension to react for about 2 hours, to achieve a red clear solution. The red clear solution is the modifier of the example 1.

Applications of the Modifier of Lithium Ion Battery (a) Applying the Modifier to Current Collectors of Lithium Ion Battery The modifier can be applied to the current collector of the lithium ion battery to increase the stability of the lithium ion battery. The modifier can be easily coated on the surface of the current collector of the lithium ion battery such that an even and thin protective film can be formed on the surface of the current collector after a heat treating process. The protective film can prevent unwanted side reactions between the current collector and the solvent of the electrolyte of the lithium ion battery. The protective film is thin and barely influences the conductivity of the current collector.

Figure 2:
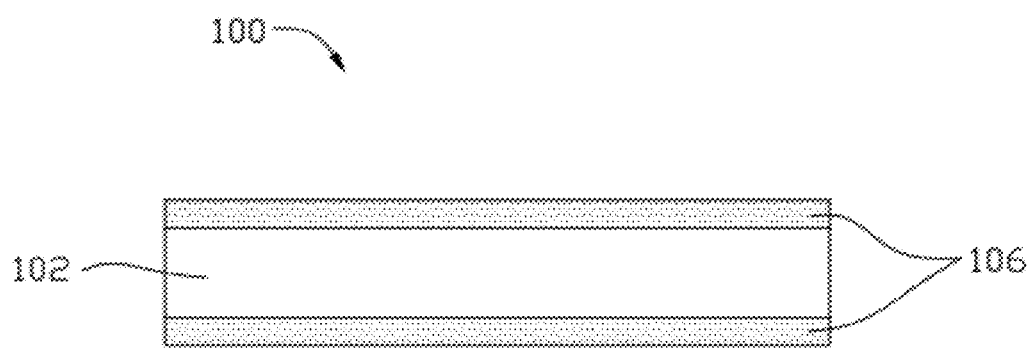
FIG. 2 is a schematic side view of an embodiment of a current collector of a lithium ion battery fabricated using the modifier.

Referring to FIG. 2, one embodiment of a modified current collector 100 of the lithium ion battery is prepared by using the modifier mentioned above. The modified current collector 100 includes a metal plate 102 and a protective film 106 disposed on a surface of the metal plate 102. The composition of the protective film 106 is at least one of Al$_x$M$_y$PO$_4$ and Al$_x$M$_y$(PO$_3$)$_3$. M represents at least one chemical element of Cr, Zn, Mg, Zr, Mo, V, Nb, and Ta. A valence of M is represented by k, wherein 0<x<1, 0<y<1, and 3x+ky=3.

The material of the metal plate 102 can be metals such as aluminum (Al), copper (Cu), nickel (Ni), or alloys thereof, used as a conventional current collector in the lithium ion battery. In one embodiment, the metal plate 102 is an aluminum foil. In one embodiment, a thickness of the metal plate 102 is in a range from about 5 micrometers to about 60 micrometers, and a width of the metal plate 102 is in a range from about 10 millimeters to about 300 millimeters. A thickness of the protective film 106 can be in a range from about 10 nanometers to about 200 nanometers. In one embodiment, the thickness of the protective film 106 is in a range from about 50 nanometers to about 60 nanometers. In one embodiment, the composition of the protective film 102 is at least one of $Al_xCr_{1-x}PO_4$ and $Al_xCr_{1-x}(PO_3)_3$.

One embodiment of a method for making the modified current collector 100 of the lithium ion battery using the modifier includes the following steps:

S21, providing the modifier prepared by the method mentioned above and the metal plate 102;

S22, coating the modifier on the surface of the metal plate 102 to form a coating layer; and S23, heat treating the coated metal plate 102 to transform the coating layer into a protective film 106 formed on the surface of the metal plate 102.

In step S22, the modifier can be evenly coated on one or two surfaces of the metal plate 102 by methods such as knife coating, brushing, spraying, electrostatic coating, roll coating, screen printing, or dip coating. A thick coating layer may be unacceptable, because the conductivity of the metal plate 102 decreases with a thick coating layer. Dip coating can form an even and continuous coating layer on opposite surfaces of the metal plate 102 simultaneously, and using the dip coating method can conveniently control the thickness of the coating layer. In one embodiment, dip coating is used to coat the modifier on the two surfaces of the metal plate 102.

Dip coating includes the steps of completely dipping the metal plate 102 into the prepared modifier, and then lifting the coated metal plate 102 out from the modifier. The metal plate 102 can be substantially perpendicular to the level of the modifier during the lifting process. The steps of dipping and lifting can be repeated several times to control the thickness and uniformity of the coating layer on the surface of the metal plate 102. A thinner coating layer can be formed by reducing the concentration of the modifier and dipping and lifting the dipped metal plate 102 in and out of the modifier at a faster rate.

The coated metal plate 102 can be dried to remove the liquid phase solvent of the coating layer before the heat treating process of the step S23. The coated metal plate 102 can be air dried or heat dried.

In step S23, the heat treating step not only can further evaporate the liquid phase solvent of the coating layer, but also transform the coating layer into a continuous protective film 106 formed on the surface of the metal plate 102. The protective film 106 can prevent the metal plate 102 from corroding the substance in the electrolyte of the lithium ion battery. A temperature of the heat treating process can be in a range from about 100° C. to about 350° C. In one embodiment, the temperature of the heat treating process is in a range from about 150° C. to about 250° C. A time period for the heat treating process can be in a range from about 1 hour to about 3 hours.

As a sticky clear solution, the modifier can be easily coated on the surface of the metal plate 102 of the modified current collector 100, and an even and thin protective film 106 can be formed on the surface of the metal plate 102 of the modified current collector 100 after the heat treating process. The protective film 106 can prevent unwanted side reactions of the modified current collector 100 and the substance in the electrolyte of the lithium ion battery. The protective film 106 barely influences the conductivity of the modified current collector 100.

The following example further illustrates the modified current collector 100 of the present disclosure.

EXAMPLE 2

Preparation of the Modified Current Collector 100 of the Lithium Ion Battery

An aluminum foil with 20 microns thickness and 30 millimeters width is used as the metal plate 102. 0.5 milliliters Triton and 30 milliliters of water are added to the prepared modifier in the Example 1 to dilute the modifier. The Triton and water added causes the aluminum foil to immerse easily with the modifier. The diluted modifier is ultrasonically vibrated. The diluted modifier is coated on the surface of the aluminum foil by using the dip-coating method. The coated aluminum foil is dried in an oven at about 80° C. for about half of an hour, and then heat treated in the muffle furnace at about 200° C. for about an hour, thereby forming the protective layer 106 on the modified current collector 100. The thickness of the protective film 106 is about 52 nanometers. The concentration of the diluted modifier is about 0.0432 g/ml.

Figure 3:
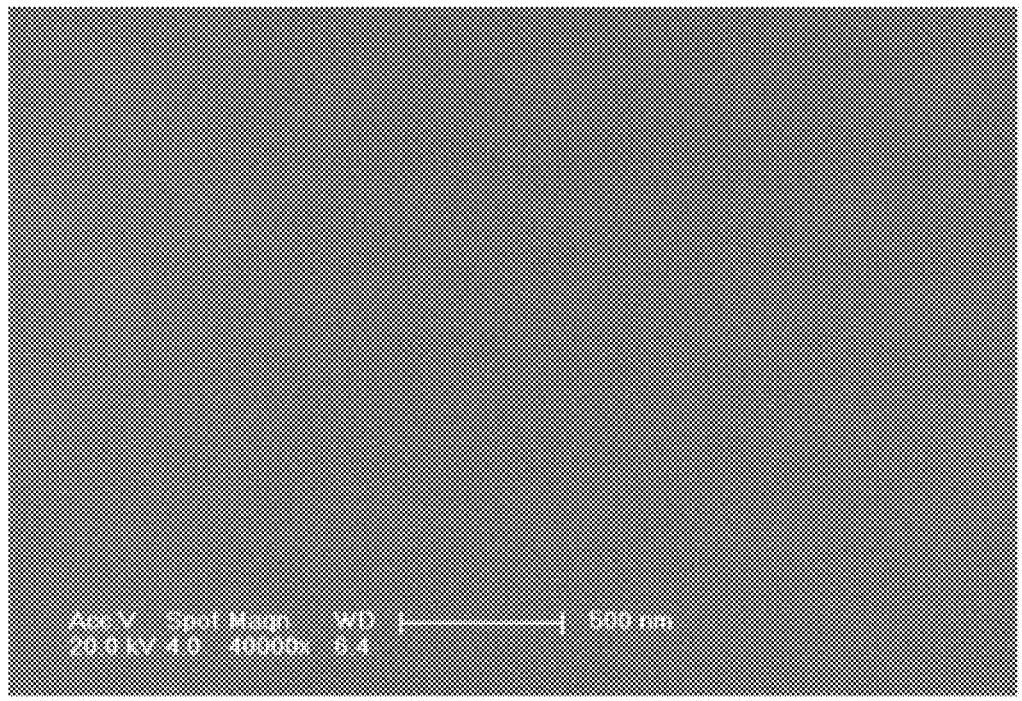
FIG. 3 shows a Scanning Electron Microscope (SEM) image of the current collector of the lithium ion battery.
Figure 4:
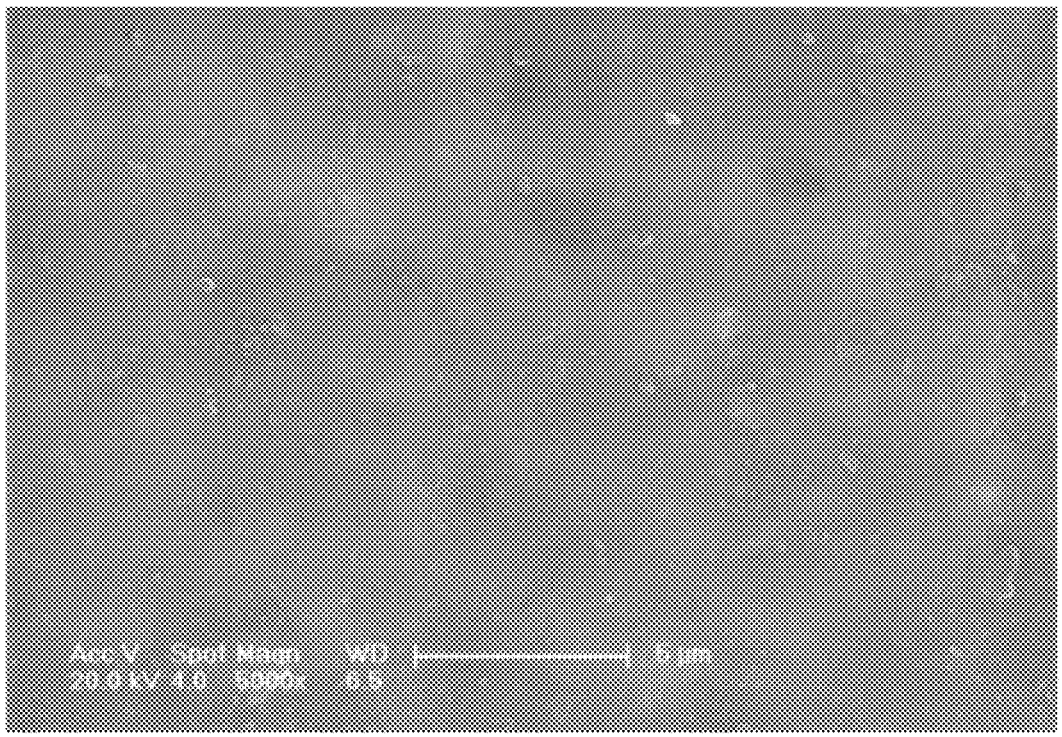
FIG. 4 shows a SEM image of a conventional current collector of the lithium ion battery.

A conventional aluminum current collector is used to compare with the modified current collector 100 prepared in the Example 2. First, the modified current collector 100 and the conventional aluminum current collector are observed in the Scanning Electron Microscope (SEM) to compare their surface morphology. Referring to FIG. 4, there are many defect holes in the surface of the conventional aluminum current collector. Referring to FIG. 3, the surface of the modified current collector 100 having the protective film 106 prepared in the Example 2 is smooth and dense.

The corrosion resistance of the modified current collector 100 of the Example 2 and the conventional aluminum current collector that have been observed in the SEM is also compared. The modified current collector 100 of the Example 2 is immersed in a container with hydrochloric acid, and the conventional aluminum current collector is immersed in another container with hydrochloric acid. Bubbles are observed on the surface of the conventional aluminum current collector after a period of time, indicating that the conventional aluminum current collector has been eroding. There are no bubbles observed on the surface of the modified current collector 100 of the Example 2 immersed in the hydrochloric acid for 4 hours. The conductivity of the modified current collector 100 of the Example 2 is also tested. The result indicates that the modified current collector 100 having the protective film 106 still has good conductivity, and can meet the requirements when it is used in the lithium ion battery.

Figure 5:
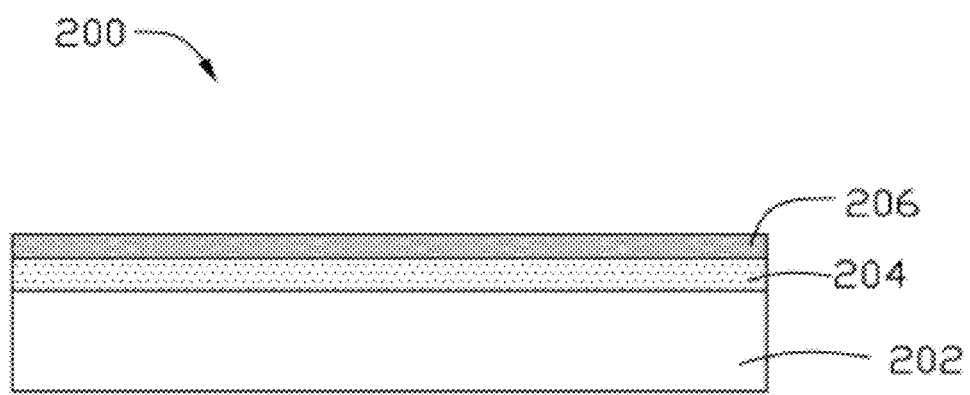
FIG. 5 is a schematic side view of an embodiment of an electrode of the lithium ion battery fabricated using the modifier.

(b) Applying the Modifier to Electrode Material Layers of the Lithium Ion Battery Referring to FIG. 5, one embodiment of an electrode 200 of the lithium ion battery includes a current collector 202, an electrode material layer 204 disposed on a top surface of the current collector 202, and a protective film 206 located on a top surface of the electrode material layer 204. The composition of the protective film 206 is at least one of $Al_xM_yPO_4$ and $Al_xM_y(PO_3)_3$. M represents at least one of chemical elements of Cr, Zn, Mg, Zr, Mo, V, Nb, and Ta. A valence of M is represented by k, wherein $0<x<1$, $0<y<1$, and $3x+ky=3$. The protective film 206 is fabricated using the modifier of the lithium ion battery mentioned above. In one embodiment, the composition of the protective film 206 can be at least one of $Al_xCr_{1-x}PO_4$ and $Al_xCr_{1-x}(PO_3)_3$.

The material of the current collector 202 can be metals such as aluminum (Al), copper (Cu), nickel (Ni), or alloys thereof. The material of the electrode material layer 204 includes an electrode active material, a conductive agent, and a binder. The electrode active material can be a cathode active material for a cathode electrode or an anode active material for an anode electrode. The cathode active material can be doped or undoped spinel lithium manganese oxide, layered lithium manganese oxide, lithium nickel oxide, lithium cobalt oxide, lithium iron phosphate, lithium nickel manganese oxide, lithium nickel cobalt oxide, or any combination thereof. Specifically, the formula of the spinel lithium manganese oxide can be $Li_xMn_{2-y}L_yO_4$. The formula of the lithium nickel oxide can be $Li_xNi_{1-y}L_yO_2$. The formula of the lithium cobalt oxide can be $Li_xCO_{1-y}L_yO_2$. The formula of the layered lithium manganese oxide can be $Li_xMn_{1-y}L_yO_2$. The formula of the lithium iron phosphate can be $Li_xFe_{1-y}L_yPO_4$. The formula of the lithium nickel manganese oxide can be $Li_xNi_{0.5-z-a}Mn_{1.5-z-b}L_aR_bO_4$. The formula of the lithium nickel cobalt oxide can be $Li_xNi_cCO_dMn_eL_fO_2$. In the above formulas, $0.1 \leq x \leq 1.1$, $0 \leq y < 1$, $0 \leq z < 1.5$, $0 \leq a-z < 0.5$, $0 \leq b+z < 1.5$, $0 \leq c \leq 1$, $0 < d < 1$, $0 < e < 1$, $0 \leq f \leq 0.2$, and $c+d+e+f=1$. L and R represent at least one of the chemical elements of alkali metal elements, alkaline-earth metal elements, Group-13 elements, Group-14 elements, transition metal elements, and rare-earth elements. In one embodiment, L and R represent at least one of the chemical elements of Mn, Ni, Cr, Co, V, Ti, Al, Fe, Ga, Nd, and Mg. The anode active material can be lithium titanate, graphite, acetylene black, organic cracking carbon, mesocarbon microbeads (MCMB), or any combination thereof. More specifically, the formula of the lithium titanate can be $Li_{(4-g)}A_gTi_5O_{12}$ or $Li_4A_hTi_{(5-h)}O_{12}$, wherein $0 < g \leq 0.33$ and $0 < h \leq 0.5$. In the formula, 'A' represents at least one of the chemical elements of alkali metal elements, alkaline-earth metal elements, Group-13 elements, Group-14 elements, transition metal elements, and rare-earth elements. In one embodiment, 'A' represents at least one of the chemical elements of Mn, Ni, Cr, Co, V, Ti, Al, Fe, Ga, Nd, and Mg. The conductive agent can be at least one of graphite, Polyvinylidene Fluoride (PVDF), Polytetrafluoroethylene (PTFE), and Styrene-Butadiene Rubber (SBR). The electrode active material, the conductive agent, and the binder can be other commonly used materials.

One embodiment of a method for making the electrode 200 by using the modifier includes the following steps:

S31, forming the electrode material layer 204 on the top surface of the current collector 202;

S32, coating the modifier on the top surface of the electrode material layer 204 to form a coating layer; and S33, heat treating the coated current collector 202, wherein the coating layer is transformed to a protective film 206 formed on the top surface of the electrode material layer 204.

The step S31 further includes the steps of mixing the electrode active material particles, the conductive agent, and the binder to form a slurry and coating the slurry on the top surface of the current collector 202 to form the electrode material layer 204. The electrode material layer 204 can be adhered to the top surface of the current collector 202 by a heating process.

Because the clear solution is sticky, the modifier can be easily and evenly coated on the electrode material layer 204 by methods such as knife coating, brushing, spraying, electrostatic coating, roll coating, screen printing, or dip coating. A thick coating layer may decrease the conductivity of the electrode 200.

In step S33, the heat treating step not only can evaporate the liquid phase solvent of the coating layer, but also transform the coating layer into a continuous protective film 206 formed on the surface of the electrode material layer 204. The protective film 206 can prevent the electrode active material in the electrode material layer 204 from the corrosion of the substance in the electrolyte of the lithium ion battery. The heat treating process temperature can be in a range from about 100° C. to about 200° C. A time period for the heat treating process can be in a range from about 1 hour to about 3 hours. A thickness of the protective film 206 can be in a range from about 10 nanometers to about 200 nanometers. In one embodiment, the thickness of the protective film 206 can be in a range from about 50 nanometers to about 60 nanometers. The thin protective film 206 barely influences the conductivity of the electrode 200 of the lithium ion battery.

Figure 6:
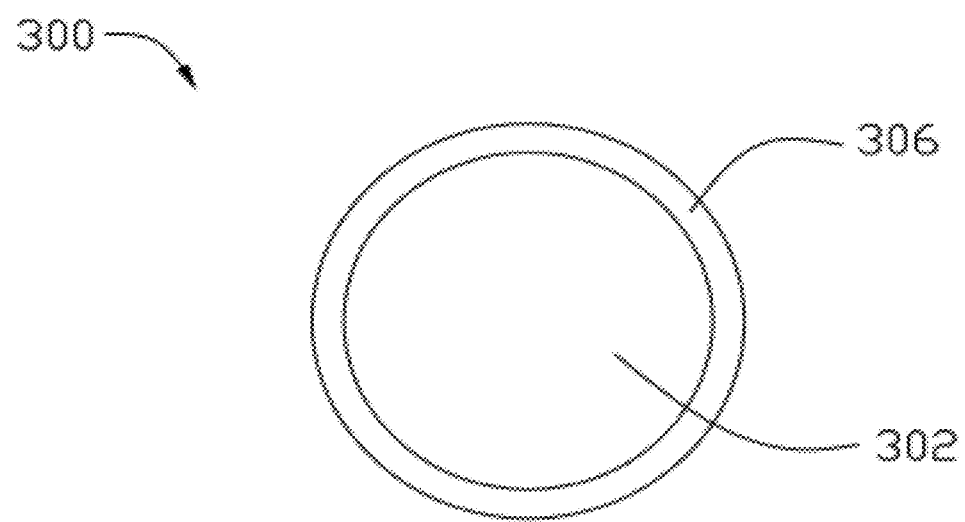
FIG. 6 is a schematic view of an embodiment of an electrode composite material of the lithium ion battery fabricated using the modifier.

(c) Applying the Modifier to Individual Electrode Active Material Particle of the Lithium Ion Battery The modifier of the lithium ion battery can be applied to increase the thermal stability and safety of the electrode active material. Referring to FIG. 6, one embodiment of an electrode composite material 300 includes a plurality of electrode active material particles 302 and a protective film 306 coated on the surface of each of the individual particle 302. A composition of the protective film 306 is at least one of $Al_xM_yPO_4$ and $Al_xM_y(PO_3)_3$. M represents at least one of the chemical elements of Cr, Zn, Mg, Zr, Mo, V, Nb, and Ta. A valence of M is represented by k, wherein $0 < x < 1$, $0 < y < 1$, and $3x+ky=3$. The steps include coating the modifier on the surface of the electrode active material particle 302, and heat treating the coated electrode active material particle 302 to form the protective film 306 coated on the surface of the electrode active material particle 302.

The protective film 306 can be coated evenly and continuously on the surface of the electrode active material particle 302. In one embodiment, a mass ratio of the protective film 306 to the electrode composite material 300 is in a range from about 0.05% to about 3%. The thickness of the protective film 306 is in a range from about 5 nanometers to about 100 nanometers. The material of the electrode active material particle 302 can be a cathode active material for a cathode electrode or an anode active material for an anode electrode. The cathode active material can be doped or undoped spinel lithium manganese oxide, layered lithium manganese oxide, lithium nickel oxide, lithium cobalt oxide, lithium iron phosphate, lithium nickel manganese oxide, lithium nickel cobalt oxide, or any combination thereof. Specifically, the formula of the spinel lithium manganese oxide can be $Li_xMn_{2-y}L_yO_4$. The formula of the lithium nickel oxide can be $Li_xNi_{1-y}L_yO_2$. The formula of the lithium cobalt oxide can be $Li_xCO_{1-y}L_yO_2$. The formula of the layered lithium manganese oxide can be $Li_xMn_{1-y}L_yO_2$. The formula of the lithium iron phosphate can be $Li_xFe_{1-y}L_yPO_4$. The formula of the lithium nickel manganese oxide can be $Li_xNi_{0.5+z-a}Mn_{1.5-z-b}L_aR_bO_4$. The formula of the lithium nickel cobalt oxide can be $Li_xNi_cCO_dMn_eL_fO_2$. In the above formulas, $0.1 \leq x \leq 1.1$, $0 \leq y < 1$, $0 \leq z < 1.5$, $0 \leq a-z < 0.5$, $0 \leq b+z < 1.5$, $0 < c < 1$, $0 < d < 1$, $0 < e < 1$, $0 \leq f \leq 0.2$, and $c+d+e+f=1$. L and R represent at least one of the chemical elements of alkali metal elements, alkaline-earth metal elements, Group-13 elements, Group-14 elements, transition metal elements, and rare-earth elements. In one embodiment, L and R represent at least one of the chemical elements of Mn, Ni, Cr, Co, V, Ti, Al, Fe, Ga, Nd, and Mg. The anode active material can be lithium titanate, graphite, acetylene black, organic cracking carbon, mesocarbon microbeads (MCMB), or any combination thereof. More specifically, the formula of the lithium titanate can be $Li_{(4-g)}A_gTi_5O_{12}$ or $Li_4A_hTi_{(5-h)}O_{12}$, wherein $0 < g \leq 0.33$ and $0 < h \leq 0.5$. 'A' represents at least one of the chemical elements of alkali metal elements, alkaline-earth metal elements, Group-13 elements, Group-14 elements, transition metal elements, and rare-earth elements. In one embodiment, 'A' represents at least one of the chemical elements of Mn, Ni, Cr, Co, V, Ti, Al, Fe, Ga, Nd, and Mg. In one embodiment, a diameter of the electrode active material particle 302 is in a range from about 100 nanometers to about 100 microns. The material of the electrode active material particle 302 can be other commonly used materials. In one embodiment, graphite powder is used as the electrode active material particle 302 for the anode electrode. The diameter of the graphite powder is in a range from about 8 microns to about 12 microns. The composition of the protective film is at least one of $Al_xCr_{1-x}PO_4$ and $Al_xCr_{1-x}(PO_3)_3$.

One embodiment of a method for making the electrode composite material 300 of the lithium ion battery by using the modifier includes the following steps:

B11, providing the modifier and the electrode active material particles 302;

B12, mixing the active material particles 302 and the modifier to form a mixture; and B13, drying and heat treating the mixture.

In step B12, the step of mixing is a solid-liquid mixing. The electrode active material particle 302 is insoluble in the modifier. The modifier can be wholly and easily coated on the surface of the each electrode active material particle 302 to form a thin and even coating layer.

The method can further include a step of filtering the coated electrode active material particles 302 from the modifier after the step B12.

In step B13, a method of the drying can be air drying or heat drying to remove the liquid phase solvent of the mixture. A temperature of the heat drying process can be in a range from about 60° C. to about 100° C. In one embodiment, the heat drying is used to dry the mixture, and the temperature of the heat drying process is about 80° C. The heat treating step can transform the coating layer into an even and continuous protective film 306 well coated on the surface of the each electrode active material particle 302. A temperature of the heat treating process can be in a range from about 300° C. to about 800° C. A time period for the heat treating process can be in a range from about 1 hour to about 3 hours. In one embodiment, the temperature of the heat treating process is about 700° C. The time period for the heat treating process is about 3 hours. A mass ratio of the protective film 306 to the electrode composite material 300 can be in a range from about 0.05% to about 3%. The thickness of the protective film 306 can be in a range from about 5 nanometers to about 100 nanometers.

The modifier can be easily and wholly coated on the surface of each electrode active material particle 302 to form an even and continuous protective film 306. The protective film 306 can insulate the transfer of electrons between the electrode active material particles 306 and the electrolyte of the lithium ion battery as well as allow the lithium ions to pass. Therefore, the protective film 306 can increase the thermal stability and capacity retention of the lithium ion battery, and not decrease the electrochemical performance of the lithium ion battery.

(d) Applying the Modifier to Separators of the Lithium Ion Battery

Figure 7:
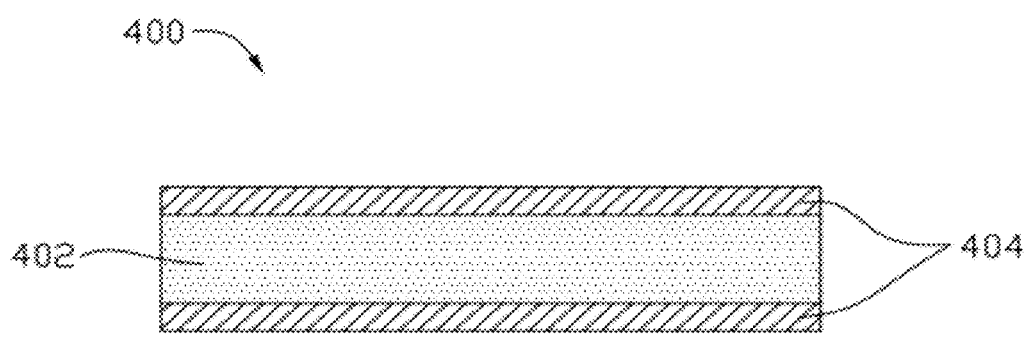
FIG. 7 is a schematic side view of an embodiment of a separator of the lithium ion battery fabricated using the modifier.

Referring to FIG. 7, one embodiment of a separator 400 of the lithium ion battery, fabricated using the modifier prepared in the Example 1, includes a porous membrane 402 and a modifier layer 404 disposed on the surface of the porous membrane 402. The steps include coating the modifier on the surface of the porous membrane 402 to form a coating layer, and drying the coating layer to form the modifier layer 404.

The porous membrane 402 can be commonly used separators of the lithium ion battery, such as a pure polymer separator, a ceramic separator, or a polymer based separator having ceramic materials therein. A thickness of the porous membrane 402 can be in a range from about 5 microns to about 60 microns. A porosity of the porous membrane 402 can be in a range from about 20% to about 90%. A diameter of the porous membrane 402 can be in a range from about 0.01 microns to about 80 microns. In one embodiment, the thickness of the porous membrane 402 is in a range from about 15 microns to about 40 microns, the porosity of the porous membrane 402 is in a range from about 40% to about 80%, and the diameter of the porous membrane 402 is in a range from about 0.1 microns to about 10 microns.

Two surfaces of the porous membrane 402 are coated with the modifier layers 404. A thickness of the modifier layer 404 can be in a range from about 10 nanometers to about 100 nanometers. In one embodiment, the thickness of the modifier layer 404 is in a range from about 10 nanometers to about 40 nanometers.

In one embodiment of a method for preparing the separator 400 of the lithium ion battery by using the modifier includes the following steps:

B21, providing the modifier of the lithium ion battery and the porous membrane 402;

B22, coating the modifier on the surface of the porous membrane 402 to form a coating layer; and B23, drying the coated porous membrane 402 to form the modifier layer 404 disposed on the surface of the porous membrane 402.

In step B21, the porous membrane 402 can be prepared by a method of melt stretching or thermally induced phase separation.

In step B22, the modifier can be evenly coated on one or two surfaces of the porous membrane 402 by methods such as knife coating, brushing, spraying, electrostatic coating, roll coating, screen printing, or dip coating. Dip coating maximizes the control of the thickness and evenness of the coating layer. In one embodiment, the dip coating method is used to coat the modifier on opposite surfaces of the porous membrane 402.

More specifically, the dip coating method includes the steps of completely dipping the porous membrane 402 into the prepared modifier, and lifting the dipped porous membrane 402 out from the modifier. The porous membrane 402 can be substantially perpendicular to the level of the modifier during the lifting process. The steps of dipping and lifting can be repeated several times to control the thickness and evenness of the coating layer on the surface of the porous membrane 402. A thinner coating layer can be formed by reducing the concentration of the modifier and dipping and lifting the dipped porous membrane 402 in and out of the modifier at a faster rate.

In step B23, the liquid phase solvent of the modifier can be removed and the formed modifier layer can be well combined with the surface of the porous membrane 402 by drying the coated porous membrane 402. The coated porous membrane 402 can be dried by air drying or heat drying. A temperature of the heat drying process may be equal to or lower than 70° C.

As a clear sticky solution, the modifier can be easily and evenly coated on the surface of the porous membrane 404 to form a thin modifier layer 404. The existence of the modifier layer 404 can increase the mechanical strength of the separator 400 and not decrease the lithium ion mobility when applied to a lithium ion battery. The modifier layer 404 of the separator 400 can be transformed to a continuous protective film to prevent the shrinkage of the separator 400 when its temperature reaches to or higher than 100° C. The thermal stability and the safety of the lithium ion battery thus can be increased. The composition of the protective film can be at least one of $Al_xM_yPO_4$ and $Al_xM_y(PO_3)_3$. M represents at least one of the chemical elements of Cr, Zn, Mg, Zr, Mo, V, Nb, and Ta. A valence of M is represented by k, wherein 0<x<1, 0<y<1, and 3x+ky=3.

The following example further illustrates the separator 400 of the present disclosure.

EXAMPLE 3

Preparation of the Separator 400 of the Lithium Ion Battery

A bare polypropylene porous membrane commonly used as a separator of the lithium ion battery with 60% porosity and 7 microns average diameter is used as the porous membrane 402 in the Example 3. The concentration of the modifier prepared in the Example 1 is diluted to about 1 mol/L. The diluted modifier is then coated on opposite surfaces of the polypropylene porous membrane using the dip coating method. The coated polypropylene porous membrane is dried at about 40° C. for about an hour. The separator 400 having the modifier layer 404 is formed. The thickness of the modifier layer 404 is about 20 nanometers.

Figure 8:
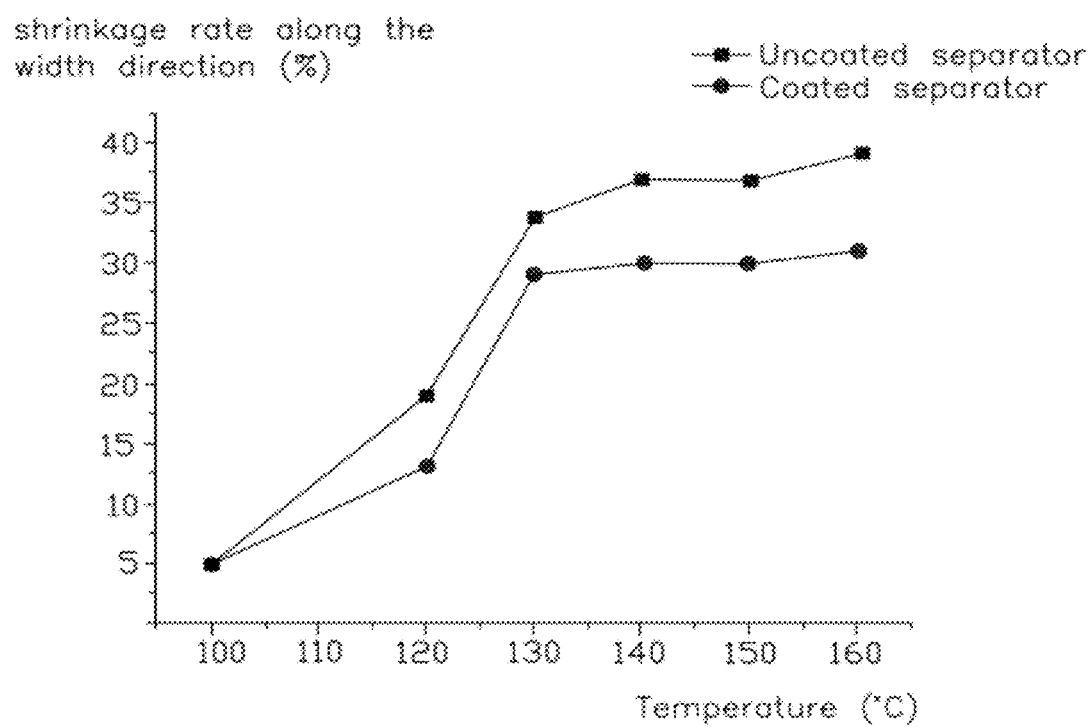
FIG. 8 is a comparison plot showing a testing result of the heat shrinkage of the separator compared with a comparing separator of lithium ion battery.

The separator 400 prepared in the Example 3 and the bare polypropylene porous membrane are both heated in the same condition at different temperatures for an hour to test their thermal shrinkage resistance. As the heat shrinkage rates decrease along the length direction of the separator 400 and the bare polypropylene porous membrane, the heat shrinkage rates along the width direction of the separator 400 and the bare polypropylene porous membrane are tested. Both the length direction and width direction are coplanar to the surface of the separator 400. Referring to FIG. 8, the separator 400 of the Example 3 has a good thermal shrinkage resistance at different temperatures compared to the uncoated bare polypropylene porous membrane.

Additionally, electrochemical and safety performances of a LiFePO$_4$/graphite lithium ion battery having the separator 400 prepared in the Example 3 and a LiFePO$_4$/graphite lithium ion battery having the uncoated bare polypropylene membrane as the separator therein are tested. The results show that the electrochemical performance of the LiFePO$_4$/graphite lithium ion battery having the separator 400 does not decrease, and its thermal stability, and safety performance increases.

(e) Lithium Ion Battery

Figure 9:
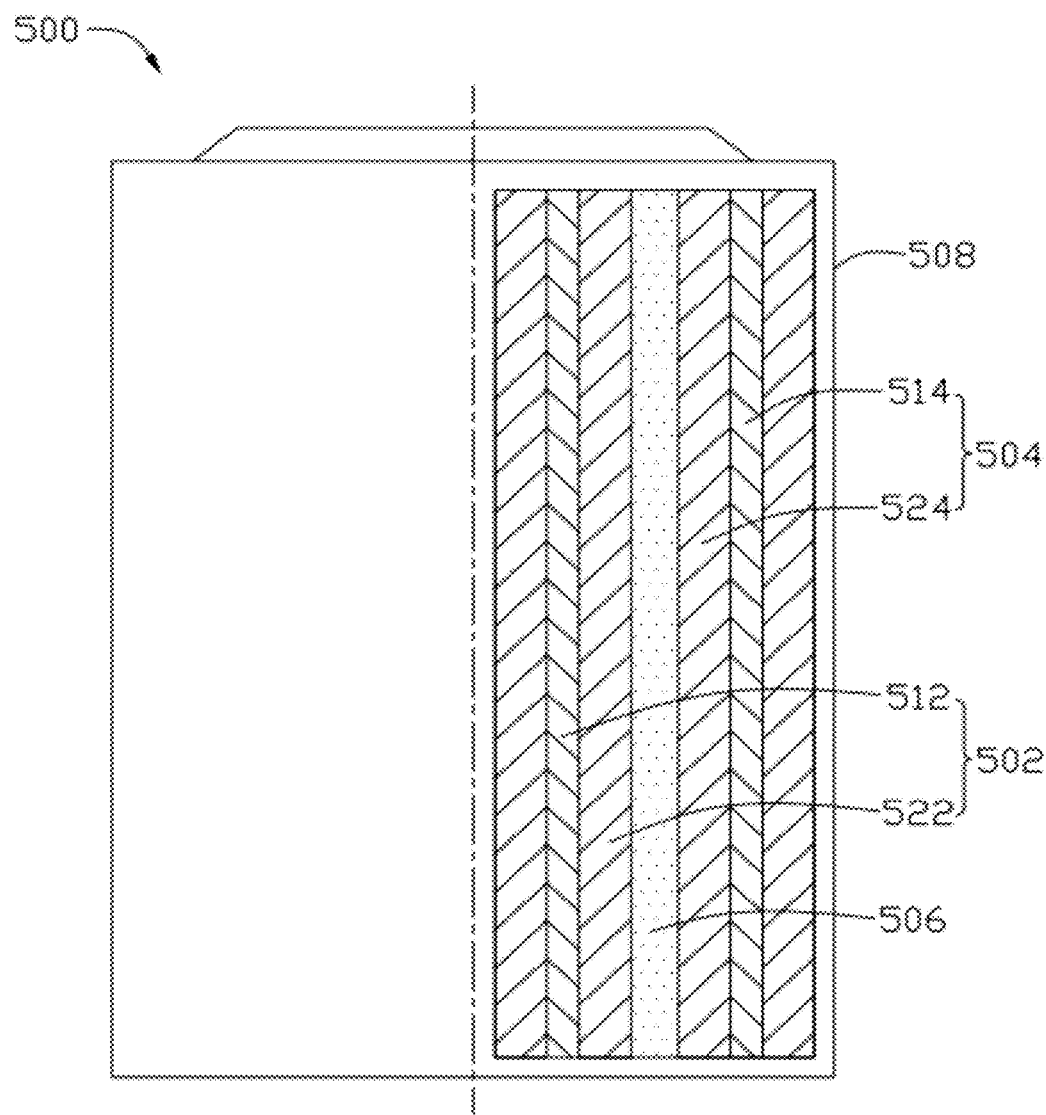
FIG. 9 is a partial section view of an embodiment of a lithium ion battery.
Figure 10:
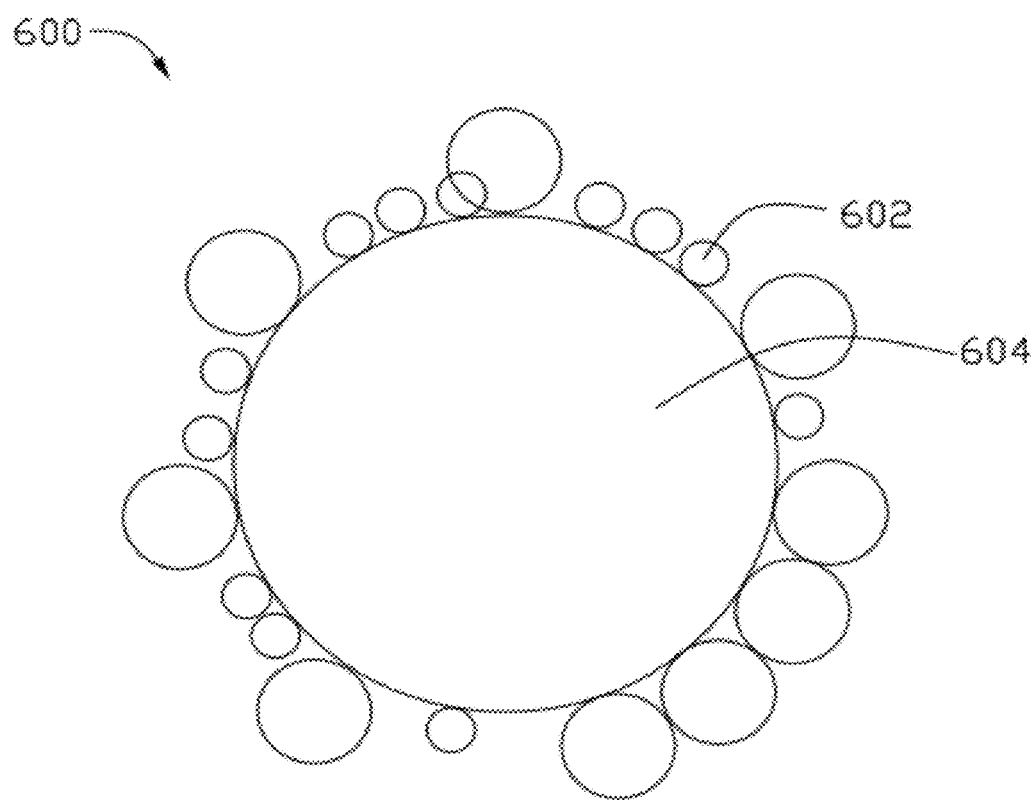
FIG. 10 is a schematic view of a conventional cathode active material coated with aluminum phosphate.

Referring to FIG. 9, one embodiment of a lithium ion battery 500 includes a cathode 502, an anode 504, a separator 506, a non-aqueous electrolyte solution, and an exterior encapsulating structure 508. The cathode 502, the anode 504, the separator 506, and the non-aqueous electrolyte solution are encapsulated by the exterior encapsulating structure 508. The separator 506 is disposed between the cathode 502 and the anode 504. The cathode 502 further includes a cathode current collector 512 and a cathode material layer 522 disposed on the surface of the cathode current collector 512. The anode 504 further includes an anode current collector 514 and an anode material layer 524 disposed on the surface of the anode current collector 514. At least one of the cathode current collector 512, the cathode material layer 514, the anode current collector 522, the anode material layer 524, and the separator 506 includes the composition of the modifier or the composition of the reaction product of the modifier heated at the heating temperature. The heating temperature is equal to or higher than 100° C.

The modifier is a mixture of the phosphorus source having the phosphate radical, the trivalent aluminum source, and the metallic oxide in the liquid phase solvent. The composition of the reaction product of the modifier is at least one of $Al_xM_yPO_4$ and $Al_xM_y(PO_3)_3$. M represents at least one chemical element of Cr, Zn, Mg, Zr, Mo, V, Nb, and Ta. A valence of M is represented by k, wherein 0<x<1, 0<y≦1, and 3x+ky=3. In one embodiment, the composition of the reaction product is at least one of $Al_xCr_yPO_4$ and $Al_xCr_y(PO_3)_3$.

The cathode 502 can use the electrode 200 having a cathode material layer. Similarly, the anode 504 can use the electrode 200 having an anode material layer. The cathode current collector 512 can use the modified current collector 100 or the current collector 202. The anode current collector 514 can also use the modified current collector 100 or the current collector 202 of the lithium ion battery.

More specifically, the cathode material layer 522 includes uniformly mixed cathode active material, conductive agent, and binder. The anode material layer 524 includes the uniformly mixed anode active material, conductive agent, and binder. The cathode active material in the cathode material layer 522 can use the electrode composite material 300 having the cathode active material particle or the uncoated cathode active material particle 302. Similarly, the anode active material in the anode material layer 524 can use the electrode composite material 300 having the anode active material particle or the uncoated anode active material particle 302.

The lithium ion battery 500 can use the porous membrane 402 or the separator 400 of the lithium ion battery as the separator 506.

The non-aqueous electrolyte solution includes an electrolyte salt dissolved in an organic solvent. The electrolyte salt can be lithium hexafluorophosphate (LiPF$_6$), lithium tetrafluoroborate (LiBF$_4$), or lithium bis(oxalato) borate (LiBOB). The organic solvent can be at least one of ethylene carbonate (EC), propylene carbonate (PC), ethylmethyl carbonate (EMC), diethyl carbonate (DEC), and dimethyl carbonate (DMC). The exterior encapsulating structure 508 can be a hard battery case or a soft encapsulating bag. The lithium ion battery 500 can further include a connecting component (not labeled in FIG. 9) achieving an electrical connection between the current collector of the lithium ion battery and the external circuit.

Applying the modifier to the lithium ion battery 500 can improve safety without decreasing the electrochemical performance of the lithium ion battery 500. It can be understood that the modifier is not limited to be applied to the current collector, electrode active material, and separator.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a modifier of a lithium ion battery, the method comprising:
   Providing a solution of a phosphorus source having a phosphate radical;
   mixing the solution of the phosphorus source having the phosphate radical with a liquid solvent to form a first solution;
   putting a trivalent aluminum source into the first solution to form a suspension; and
   adding a metallic oxide to the suspension to react with the suspension to form a clear solution;
   wherein a molar ratio of the trivalent aluminum source, the metallic oxide and the phosphorous source is set by $(Mol_{Al}+Mol_{Metal}):Mol_p=$about 1:2.5 to about 1:4, $Mol_{Al}$ is the amount of substance of an aluminum element in the trivalent aluminum source, $Mol_{Metal}$ is the amount of substance of an metallic element in the metallic oxide, and $Mol_p$ is the amount of substance of an phosphorous element in the phosphorous source.

2. The method of claim 1, wherein the phosphorous source comprises a material that is selected from the group consisting of phosphoric acid, triammonium phosphate, aluminum phosphate, ammonium dihydrogen phosphate, aluminum dihydrogen phosphate, diammonium hydrogen phosphate, dialuminum hydrogen phosphate, and combination thereof.

3. The method of claim 1, wherein the trivalent aluminum source comprises a material that is selected from the group consisting of aluminum hydroxide, aluminum oxide, aluminum phosphate, aluminum dihydrogen phosphate, dialuminum hydrogen phosphate, and combination thereof.

4. The method of claim 1, wherein the metallic oxide comprises a material that is selected from the group consisting of chromium trioxide, zinc oxide, copper oxide, magnesium oxide, zirconium dioxide, molybdenum trioxide, vanadium pentoxide, niobium pentoxide, tantalum pentoxide, and combination thereof.

5. The method of claim 1, wherein the phosphorous source and the trivalent aluminum source both comprise a material that is selected from the group consisting of aluminum phosphate, aluminum dihydrogen phosphate, dialuminum hydrogen phosphate, and combination thereof.

6. The method of claim 1, wherein the liquid phase solvent comprises a material that is selected from the group consisting of water, N-methyl-pyrrolidone, and combination thereof.

7. The method of claim 1, wherein a total mass of the phosphate radical in the phosphorous source, the aluminum element in the trivalent aluminum source, and the metallic element in the metallic oxide divided by a volume of the modifier is in a range from about 0.02 g/ml to about 0.08 g/ml.

8. The method of claim 1, wherein the phosphorous source is phosphoric acid, the trivalent aluminum source is aluminum hydroxide, and the metallic oxide is chromium trioxide.

9. The method of claim 1 further comprising stirring and heating the first solution after the mixing the solution of the phosphorus source having the phosphate radical with the liquid solvent.

10. The method of claim 8, wherein a concentration of the phosphoric acid is in a range from about 60% to about 90%.

11. The method of claim 9, wherein a heating temperature is in a range from about 60° C. to about 100° C.

12. The method of claim 10, wherein an amount of the phosphoric acid is about 34.5 grams, an amount of the aluminum hydroxide is about 5.9 grams, and an amount of the chromium trioxide is about 2.5 grams.

13. A method for making a modifier of a lithium ion battery, the method comprising:
   providing a solution of a phosphorous source having a phosphate radical;
   mixing the solution of the phosphorous source having the phosphate radical with N-methyl-pyrrolidone to form a first solution;
   adding a trivalent aluminum source, and a metallic oxide into the first solution to react as a clear solution.

14. The method of claim 13, wherein the adding the trivalent aluminum source and the metallic oxide into the first solution comprises:
   putting the trivalent aluminum source into the first solution to form a suspension; and
   adding the metallic oxide to the suspension to react with the suspension to form the clear solution.

15. The method of claim 13, further comprising stirring the first solution at about 80° C. during the mixing the solution of the phosphorous source having the phosphate radical with the N-methyl-pyrrolidone.

16. The method of claim 13, wherein a molar ratio of the trivalent aluminum source, the metallic oxide and the phosphorous source is set by $(Mol_{Al}+Mol_{Metal}):Mol_p=$about 1:2.5 to about 1:4, $Mol_{Al}$ is the amount of substance of an aluminum element in the trivalent aluminum source, $Mol_{Metal}$ is the amount of substance of an metallic element in the metallic oxide, and $Mol_p$ is the amount of substance of an phosphorous element in the phosphorous source.

* * * * *